United States Patent
Koravadi (10) Patent No.: US 10,462,354 B2
(45) Date of Patent: Oct. 29, 2019

(54) VEHICLE CONTROL SYSTEM UTILIZING MULTI-CAMERA MODULE

(71) Applicant: MAGNA ELECTRONICS INC., Auburn Hills, MI (US)

(72) Inventor: Krishna Koravadi, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 140 days.

(21) Appl. No.: 15/832,803

(22) Filed: Dec. 6, 2017

(65) Prior Publication Data

US 2018/0167551 A1    Jun. 14, 2018

Related U.S. Application Data

(60) Provisional application No. 62/431,843, filed on Dec. 9, 2016.

(51) Int. Cl.
```
H04N 5/232      (2006.01)
B62D 15/02      (2006.01)
G05D 1/02       (2006.01)
G08G 1/16       (2006.01)
H04N 5/247      (2006.01)
```
(Continued)

(52) U.S. Cl.
CPC ........ *H04N 5/23216* (2013.01); *B60W 30/00* (2013.01); *B62D 15/0255* (2013.01); *G05D 1/0246* (2013.01); *G08G 1/167* (2013.01); *H04N 5/247* (2013.01); *B60R 1/00* (2013.01); *B60R 2300/101* (2013.01); *B60R 2300/105* (2013.01); *B60R 2300/30* (2013.01); *B60R 2300/605* (2013.01); *B60R 2300/804* (2013.01); *G05D 2201/0213* (2013.01)

(58) Field of Classification Search
CPC .. H04N 5/23216; H04N 5/247; G05D 1/0246; G05D 2201/0213; B62D 15/0255; G08G 1/167; B60R 2300/101; B60R 2300/605; B60R 1/00; B60R 2300/105; B60R 2300/30; B60R 2300/804; B60W 30/00
See application file for complete search history.

(56) References Cited

U.S. PATENT DOCUMENTS

| | | | |
|---|---|---|---|
| 5,550,677 A | 8/1996 | Schofield et al. |
| 5,670,935 A | 9/1997 | Schofield et al. |
| 5,949,331 A | 9/1999 | Schofield et al. |

(Continued)

*Primary Examiner* — Mussa A Shaawat
(74) *Attorney, Agent, or Firm* — Honigman LLP (57) ABSTRACT

A control system for a vehicle includes a camera module having a plurality of cameras. A control is operable to adjust a field of view of the cameras responsive to an input. When the vehicle is traveling in and along a traffic lane, the control sets the field of view of at least some of the cameras forward through the vehicle windshield. Responsive to an input indicative of an intended lane change, the control adjusts at least one camera to set the field of view of the camera toward an exterior rearview mirror at the side of the vehicle at which the target lane is located. Responsive to determination, via processing of captured image data when the camera views the exterior rearview mirror of the vehicle, that the target lane is clear, the control controls the at least one vehicle control system to maneuver the vehicle into the target lane.

20 Claims, 5 Drawing Sheets

(51) Int. Cl.
*B60W 30/00* (2006.01)
*B60R 1/00* (2006.01)

(56) References Cited

U.S. PATENT DOCUMENTS

| | | | |
|---|---|---|---|
| 6,587,186 B2 | 7/2003 | Bamji et al. | |
| 6,674,895 B2 | 1/2004 | Rafii et al. | |
| 6,678,039 B2 | 1/2004 | Charbon | |
| 6,690,268 B2 | 2/2004 | Schofield et al. | |
| 6,690,354 B2 | 2/2004 | Sze | |
| 6,693,517 B2 | 2/2004 | McCarthy et al. | |
| 6,710,770 B2 | 3/2004 | Tomasi et al. | |
| 6,825,455 B1 | 11/2004 | Schwarte | |
| 6,876,775 B2 | 4/2005 | Torunoglu | |
| 6,906,793 B2 | 6/2005 | Bamji et al. | |
| 6,919,549 B2 | 7/2005 | Bamji et al. | |
| 7,006,950 B1* | 2/2006 | Greiffenhagen | G08B 13/19604 |
| | | | 382/107 |
| 7,053,357 B2 | 5/2006 | Schwarte | |
| 7,157,685 B2 | 1/2007 | Bamji et al. | |
| 7,176,438 B2 | 2/2007 | Bamji et al. | |
| 7,203,356 B2 | 4/2007 | Gokturk et al. | |
| 7,212,663 B2 | 5/2007 | Tomasi | |
| 7,283,213 B2 | 10/2007 | O'Connor et al. | |
| 7,310,431 B2 | 12/2007 | Gokturk et al. | |
| 7,321,111 B2 | 1/2008 | Bamji et al. | |
| 7,340,077 B2 | 3/2008 | Gokturk et al. | |
| 7,352,454 B2 | 4/2008 | Bamji et al. | |
| 7,375,803 B1 | 5/2008 | Bamji | |
| 7,379,100 B2 | 5/2008 | Gokturk et al. | |
| 7,379,163 B2 | 5/2008 | Rafii et al. | |
| 7,405,812 B1 | 7/2008 | Bamji | |
| 7,408,627 B2 | 8/2008 | Bamji et al. | |
| 7,580,795 B2 | 8/2009 | McCarthy et al. | |
| 8,013,780 B2 | 9/2011 | Lynam | |
| 8,027,029 B2 | 9/2011 | Lu et al. | |
| 9,499,139 B2 | 11/2016 | Koravadi | |
| 9,674,490 B2* | 6/2017 | Koravadi | H04N 7/181 |
| 9,881,501 B2* | 1/2018 | Weber | G08G 1/09623 |
| 2003/0122930 A1* | 7/2003 | Schofield | B60R 1/00 |
| | | | 348/148 |
| 2004/0016870 A1* | 1/2004 | Pawlicki | B60W 30/18 |
| | | | 250/208.1 |
| 2008/0231703 A1* | 9/2008 | Nagata | H04N 7/181 |
| | | | 348/148 |
| 2010/0082195 A1* | 4/2010 | Lee | B62D 15/025 |
| | | | 701/25 |
| 2010/0245066 A1 | 9/2010 | Sarioglu et al. | |
| 2010/0253596 A1* | 10/2010 | Szczerba | G01S 13/723 |
| | | | 345/7 |
| 2010/0253597 A1* | 10/2010 | Seder | B60R 1/00 |
| | | | 345/7 |
| 2012/0062743 A1 | 3/2012 | Lynam et al. | |
| 2012/0069187 A1* | 3/2012 | Ozaki | B60R 1/00 |
| | | | 348/148 |
| 2012/0154591 A1* | 6/2012 | Baur | B60R 1/00 |
| | | | 348/148 |
| 2012/0218412 A1 | 8/2012 | Dellantoni et al. | |
| 2012/0249796 A1* | 10/2012 | Kinoshita | B60R 1/00 |
| | | | 348/148 |
| 2013/0222592 A1 | 8/2013 | Gieseke | |
| 2013/0314503 A1* | 11/2013 | Nix | G06K 9/00805 |
| | | | 348/46 |
| 2014/0218529 A1 | 8/2014 | Mahmoud et al. | |
| 2014/0333729 A1* | 11/2014 | Pflug | G06T 15/20 |
| | | | 348/47 |
| 2014/0333770 A1* | 11/2014 | Baur | B60R 1/00 |
| | | | 348/148 |
| 2014/0340510 A1* | 11/2014 | Ihlenburg | H04N 7/18 |
| | | | 348/118 |
| 2014/0375476 A1 | 12/2014 | Johnson et al. | |
| 2014/0376119 A1* | 12/2014 | Sobecki | B60R 1/074 |
| | | | 359/841 |
| 2015/0022664 A1* | 1/2015 | Pflug | H04N 7/181 |
| | | | 348/148 |
| 2015/0049193 A1* | 2/2015 | Gupta | G03B 43/00 |
| | | | 348/148 |
| 2015/0109444 A1* | 4/2015 | Zhang | B60Q 9/008 |
| | | | 348/148 |
| 2015/0124096 A1 | 5/2015 | Koravadi | |
| 2015/0158499 A1 | 6/2015 | Koravadi | |
| 2015/0251599 A1 | 9/2015 | Koravadi | |
| 2015/0352953 A1 | 12/2015 | Koravadi | |
| 2016/0036917 A1 | 2/2016 | Koravadi et al. | |
| 2016/0210853 A1 | 7/2016 | Koravadi | |
| 2016/0288699 A1* | 10/2016 | Solar | B60Q 1/143 |
| 2016/0297439 A1* | 10/2016 | Inoue | B60W 10/184 |
| 2016/0381571 A1 | 12/2016 | Koravadi et al. | |
| 2017/0158133 A1 | 6/2017 | Chundrlik, Jr. et al. | |
| 2017/0254873 A1 | 9/2017 | Koravadi | |
| 2017/0359520 A1* | 12/2017 | Boehm | H04N 5/2257 |
| 2018/0160030 A1* | 6/2018 | Chaney, Jr. | H04N 5/247 |

\* cited by examiner

VEHICLE CONTROL SYSTEM UTILIZING MULTI-CAMERA MODULE

CROSS REFERENCE TO RELATED APPLICATION

The present application claims the filing benefits of U.S. provisional application Ser. No. 62/431,843, filed Dec. 9, 2016, which is hereby incorporated herein by reference in its entirety.

FIELD OF THE INVENTION

The present invention relates generally to a vehicle vision system for a vehicle and, more particularly, to a vehicle vision system that utilizes a plurality of cameras, such as cameras having exterior fields of view at or near the vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system for a vehicle that utilizes one or more sensors (such as one or more cameras of the vehicle) and provides a method and apparatus to perform automated driving of the vehicle utilizing a multi-camera system installed in the vehicle, such as at or over the driver seat. The multi-camera control module comprises an array of cameras with different focal lengths and, depending on the intended planned driving maneuver of the vehicle, the camera(s) is/are focused forwardly through the windshield hence resulting in a high pixel density images for object detection and screen interpretation. When automated driving intends to change the lane of travel of the vehicle, then the camera array focuses on the side rearview mirror, the interior rearview mirror and the blind spot area at the side of the vehicle to detect surrounding vehicles for use in deciding whether or not to make the lane change.

These and other objects, advantages, purposes and features of the present invention will become apparent upon review of the following specification in conjunction with the drawings.

LEGEND

100—Multi-camera control module integrated in vehicle
100'—Multi-camera control module installed as separate module
102—Side rearview mirror of the vehicle
104—Steering wheel of the vehicle
106—Interior rearview mirror of the vehicle
108—Front windshield of the vehicle
110—Side window of the vehicle
112—Detection area of camera module
114—Driver seat of the vehicle
200—ECU that executes the automated driving algorithms
201—Controlling link between the ECU and the actuator
202a-d—Cameras with different focal lengths and resolution
203—Mechanical actuation link
204—Steering subsystem of the vehicle
205—Electro mechanical actuator
206—Brake subsystem of the vehicle
208—Engine and transmission subsystem of the vehicle
210—HMI module of the vehicle
211—Blind spot detector of the vehicle
212—Communication link between camera module and other subsystems
214—Wireless link between smart phone and camera module
216—Wireless link between wireless OBD connector and camera module
218—Vehicle BUS (CAN/FlexRay/Ethernet etc.)
219—Smart phone used as a HMI device
220—OBD wireless connector interface to vehicle BUS

DESCRIPTION OF THE PREFERRED EMBODIMENTS

A vehicle driver assist system and/or object detection system and/or alert system operates to capture images exterior of the vehicle (such as by utilizing cameras at the side rearview mirrors) and may process the captured image data to display images and/or to detect objects at or near the vehicle and in the predicted path of the vehicle, such as to assist a driver of the vehicle in maneuvering the vehicle and/or to autonomously or semi-autonomously control the vehicle. The vision system includes an image processor or image processing system that is operable to receive image data from one or more cameras and process the captured image data to detect objects or vehicles. Optionally, the vision system may provide an output to a display device for displaying images representative of the captured image data. Optionally, the vision system may provide a display representative of image data captured by one or more exterior viewing cameras at the vehicle, such as a rearview display or a top down or bird's eye or surround view display or the like.

Typically, a driver drives a vehicle in a traffic lane by looking forward through the windshield, and when the driver wants to change the lane, the driver will look towards the respective side rearview mirror, the interior rearview mirror and the blind spot area at the side of the vehicle, and if the side lane is clear, the driver will maneuver the vehicle to change the lane. By applying the same analogy, the multi-camera system of the present invention may communicate with an autonomous or semi-autonomous vehicle control where the control may drive the vehicle by having the camera system focus all of its cameras forward and through the windshield when the vehicle is driving straight or generally straight along and within a traffic lane of a road and, when a lane change is intended, the multi-camera system may adjust the orientation of its cameras and utilize the cameras to view the side rearview mirror, the interior rearview mirror and the blind spot area at the side of the vehicle to check for free space. Responsive to determination that the adjacent side lane is clear, the system may control the vehicle to change the lane.

Figure 1:
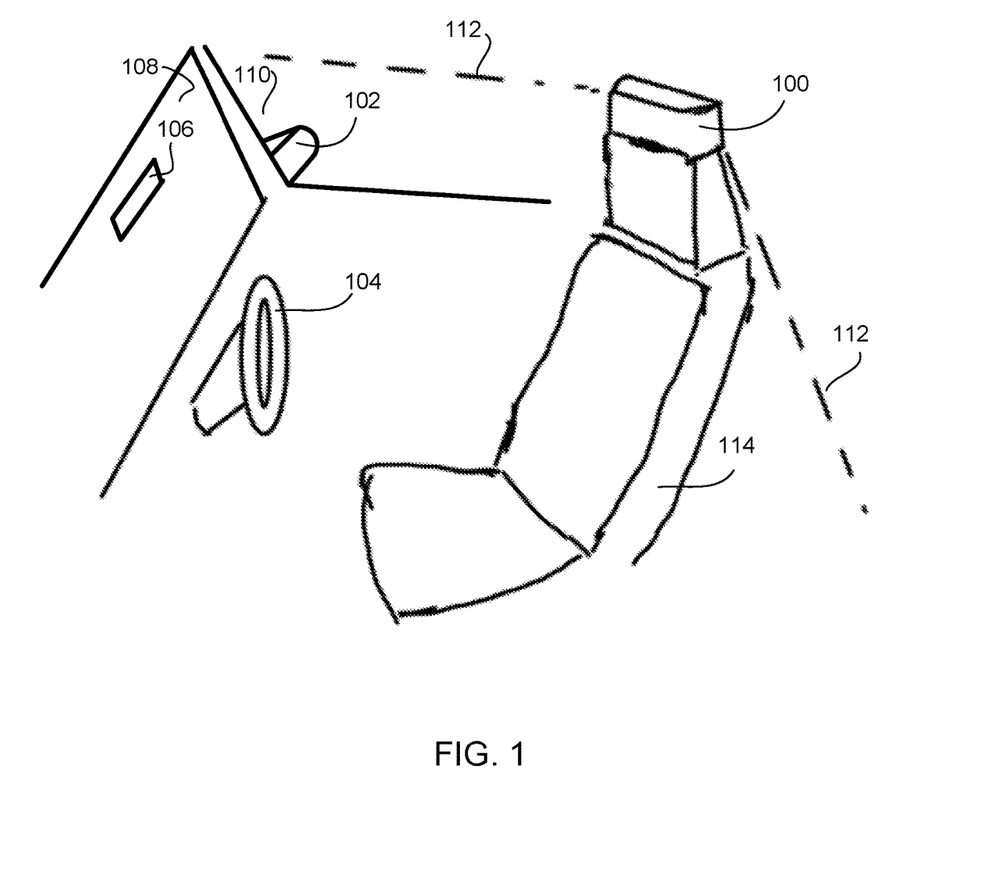
FIG. 1 is a perspective view of a multi-camera control module installed above the driver seat in accordance with the present invention.
Figure 2:
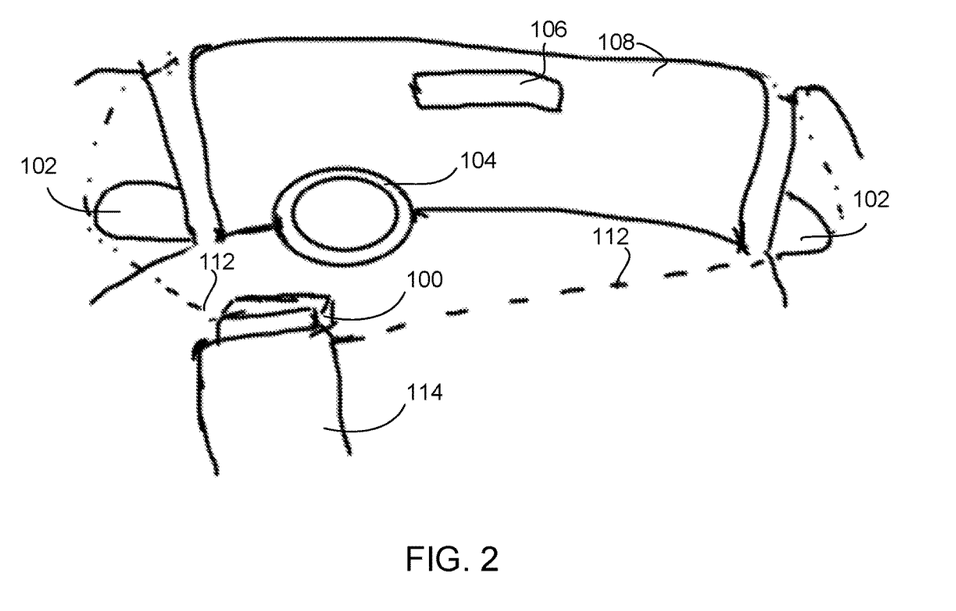
FIG. 2 is a perspective view of the multi-camera control module view looking from behind the driver seat.

The present invention provides a vision system for an autonomous vehicle control or driver assistance system, with the vision system comprising a camera module disposed at or in the vehicle cabin and having a plurality of cameras that are adjustable to view forwardly through the windshield of the vehicle and to view (i) toward an interior rearview mirror of the vehicle, (ii) toward either of the driver and passenger side exterior rearview mirrors of the vehicle and (iii) toward a blind spot area at either side of the vehicle. FIG. 1 (side view) and FIG. 2 (end view) illustrate perspective views of the system inside the vehicle, where the multi-camera module 100 is installed at or over the driver seat 104. Although shown installed at the top of the back of the driver seat, the module may be otherwise disposed in the cabin of the vehicle, such as at the roof of the cabin of the vehicle or the like.

Figure 3:
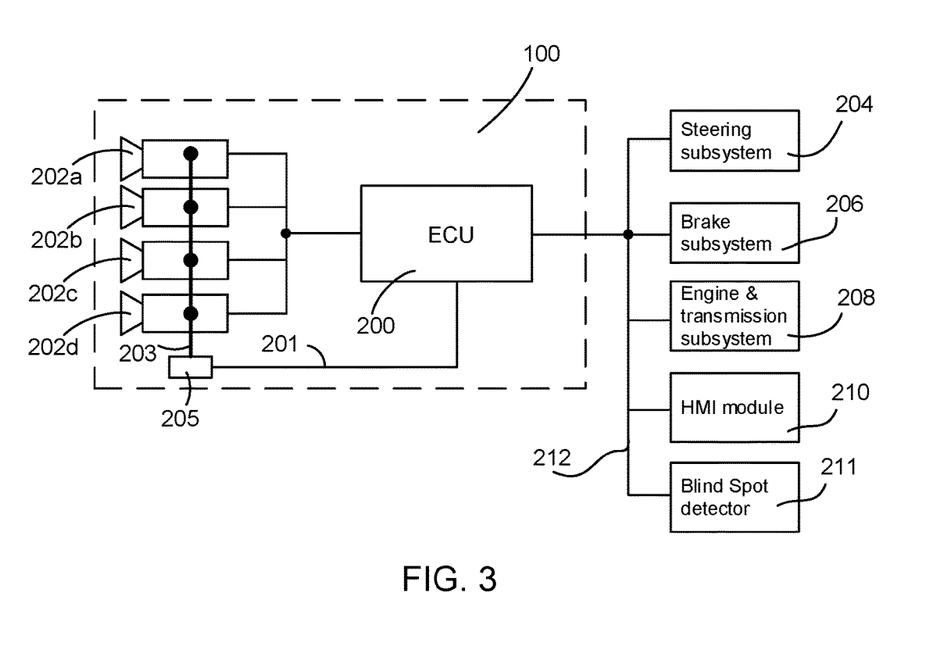
FIG. 3 is a block diagram of the multi-camera control module connected to other submodules of the vehicle.

Optionally, and such as shown in FIG. 3, the multi-camera control module 100 may comprise an integral part of the driver seat 114 and may be interfaced with the vehicle BUS to control the vehicle. As shown in FIG. 3, the camera module 100 includes a plurality of individual cameras 202a-d (or an array of cameras) that capture image data and communicate the captured image data to an ECU 200 (although shown as four cameras, the module may comprise any number of cameras, and the cameras may be linearly arranged (such as horizontally arranged or vertically arranged) or the cameras may be arranged as a two dimensional array of cameras). The cameras 202a-d may have different focal lengths and resolution, such that one or more cameras may be used to capture image data at different viewing orientations to provide the desired focus and resolution for the particular application. For example, one (or more) of the cameras may be used to capture image data when viewing forward through the windshield of the vehicle, and another one (or more) of the cameras may be used to capture image data when the module is adjusted so that the camera views the blind spot region at the side of the vehicle, where the blind spot camera(s) may have a different focal length (for focusing on closer objects) as compared to the forward viewing camera(s).

The ECU is in communication with (such as via a communication link 212 and/or a vehicle network bus or CAN bus or the like of the vehicle) a steering system or subsystem 204 of the vehicle, a brake system or subsystem 206 of the vehicle and an engine and transmission or powertrain system or subsystem 208 of the vehicle, whereby the ECU may, responsive to image processing of image data captured by the cameras, control one or more of the vehicle subsystems to maneuver the vehicle (such as when the vehicle system is operating in an autonomous mode or a semi-autonomous mode or responsive to a collision avoidance system of the vehicle or the like). The ECU may also communicate with a human-machine interface module 210, such that a user may provide an input to the ECU (such as to activate the system to put the vehicle in the autonomous or semi-autonomous mode). The ECU may also communicate with a blind spot detection system 211 of the vehicle, whereby the blind spot detector may provide additional sensing information (such as via one or more other sensors of the vehicle, such as radar sensors or ultrasonic sensors or cameras) pertaining to whether or not an object or vehicle has been determined to be present at a side lane adjacent to the lane in which the subject vehicle is traveling.

Figure 5:
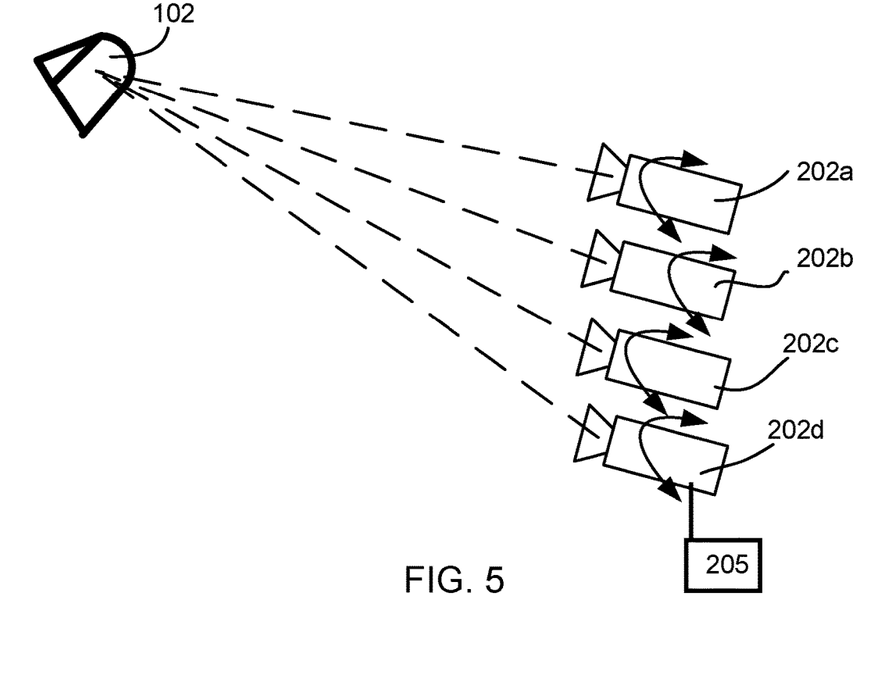
FIG. 5 is a perspective view showing the multi-camera array changing its orientation to view towards the exterior side rearview mirror.

Responsive to determination of an intended lane change or the like, the ECU may control (via its communication link or connection 201) the actuator 205 to adjust the orientation and/or viewing angle or focal length of the cameras 202a-d, such as via a mechanical actuation link 203 between the actuator and each or some of the cameras 202a-d (see FIGS. 3 and 5). The cameras may be adjusted in tandem (such that all of the cameras are adjusted to generally view toward a desired targeted region) or the cameras may be individually adjusted, whereby one or more cameras may be adjusted to view toward the side mirror while one or more other cameras may be adjusted to view toward the interior rearview mirror and one or more other cameras may be adjusted to view the blind spot region and one or more other cameras may be adjusted (or not adjusted) so as to view forward through the vehicle windshield. As shown in FIG. 5, the cameras may be pivoted together, whereby each of the cameras (shown as horizontally arranged in FIG. 5) will have a different viewing angle relative to the mirror reflective element of the exterior mirror 102, such that each of the cameras views (and captures image data of) a different region sideward and rearward of the vehicle.

When one or more of the cameras is viewing the mirror reflective element of the exterior mirror, the camera(s) captures image data of the reflection at the mirror reflective element, and thus of the scene occurring sideward and rearward of the vehicle. The camera is disposed at a location where the viewing angle of the camera and mirror reflective element approximates the viewing angle of the driver's eyes and mirror reflective element. Optionally, the mirror reflective element may adjust temporarily to provide the desired or appropriate sideward and rearward view of the blind spot region, such as when the camera(s) is capturing image data for use in blind spot monitoring and side object detection.

Figure 4:
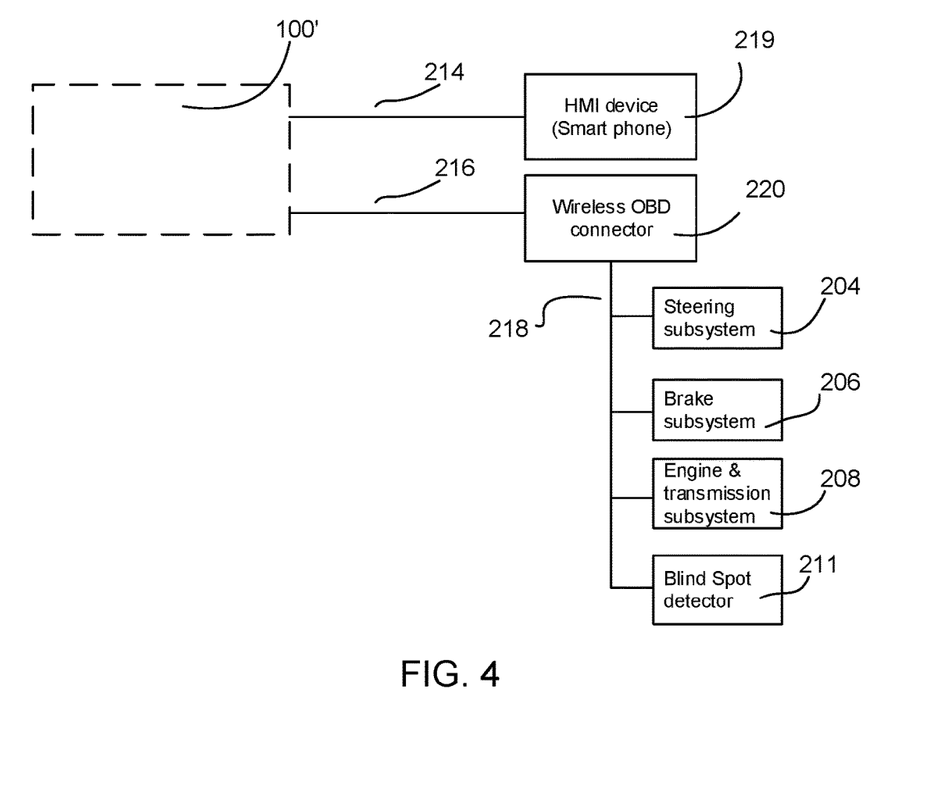
FIG. 4 is a block diagram showing system architecture as an add-on multi-camera control module.

Optionally, and such as shown in FIG. 4, the multi-camera control module 100' may be installed on the driver seat 114 as an add-on component to the vehicle control system or driver assistance system. The multi-camera control module 100' interfaces with a mobile device 219 (such as a user's smart phone or the like) via wireless interface 214 for the HMI interaction and utilizes a wireless OBD connector 220 (via wireless interface 216) to interface with the vehicle BUS 218, which is in communication with or linked with the steering system or subsystem 204 of the vehicle, the brake system or subsystem 206 of the vehicle, the engine and transmission or powertrain system or subsystem 208 of the vehicle, and the blind spot detection system 211 of the vehicle.

When the vehicle (traveling in the autonomous or semi-autonomous mode) intends to change the lane of travel of the vehicle (such as responsive to a GPS system of the vehicle or navigation system of the vehicle or a user input or the like), the multi-camera control module 100 is adjusted to have one or more of its cameras view toward the exterior side rearview mirror 102 and the interior rearview mirror 106 to detect any objects or vehicles surrounding the subject vehicle, and the system may also utilize the blind spot subsystem 211 of the vehicle to confirm that the adjacent side lane is clear before the vehicle control system maneuvers the vehicle to begin to change the lane of travel of the vehicle. When the vehicle intends to drive straight, the cameras of the multi-camera system 100 view forwardly through the windshield 108. The multi-camera system viewing angle or focus may be changed by changing the orientation of the multi-camera array 202a-d (such as by utilizing one or more electro mechanical actuators 205), such as shown in FIG. 5.

Thus, the present invention provides a vision and control module that is operable to adjust a plurality of cameras between a forward viewing orientation (where the cameras view generally forwardly through the windshield of the vehicle) and sideward viewing orientations (where the cameras view toward a respective side exterior rearview mirror and/or blind spot region at the side of the vehicle) and interior rearview mirror viewing orientation (where the cameras view toward the interior rearview mirror of the vehicle and focus on the reflected images at the mirror). The camera adjustment may be made responsive to a determination that a lane change is desired (such as responsive to a user input at an HMI interface or responsive to actuation of a turn signal indicator by the driver of the vehicle or the like or responsive to a GPS or navigation signal or input or the like). Responsive to determination (via processing of image data captured by the cameras) that the adjacent side lane is clear of other vehicles or objects, the control may communicate with the vehicle control systems (such as steering, braking and powertrain systems of the vehicle) to maneuver the vehicle into the adjacent lane. After the lane change, when the vehicle may again be driven along its lane of travel, the system may adjust the cameras to again view forward through the windshield of the vehicle (with the fields of view of the cameras encompassing the region ahead of the vehicle and sideward of the vehicle), and the control may continue to communicate with and control the various vehicle systems to maneuver the vehicle along the road in the appropriate traffic lane.

Optionally, the camera module may include only one or two cameras that are selectively adjusted to have their fields of view encompass the interior rearview mirror, one or both of the exterior rearview mirrors, a blind spot at either or both sides of the vehicle, or the like, depending on the particular driving condition and input to the control (such as a turn signal indicator actuation or the like). Optionally, the camera module may have a plurality of cameras arranged and oriented with their respective fields of view encompassing a respective one of the interior rearview mirror, the driver-side exterior rearview mirror, the passenger-side exterior rearview mirror, a driver-side blind spot at a driver side of the vehicle, a passenger-side blind spot at a passenger side of the vehicle, or the like, whereby the control or processor processes image data captured by one or more of the cameras, depending on the particular driving condition and input to the control (such as a turn signal indicator actuation or the like).

The system may utilize aspects of the systems described in U.S. Publication Nos. US-2016-0381571 and/or US-2016-0210853, which are hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2017-0254873; US-2017-0158133; US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

The system may utilize sensors, such as radar or lidar sensors or the like. The sensing system may utilize aspects of the systems described in U.S. Pat. Nos. 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication No. WO 2011/090484 and/or U.S. Publication No. US-2010-0245066, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The camera system or camera module of the present invention may utilize aspects of the systems and/or modules described in International Publication Nos. WO 2013/123161 and/or WO 2013/019795, and/or U.S. Pat. Nos. 8,256,821; 7,480,149; 7,289,037; 7,004,593; 6,824,281; 6,690,268; 6,445,287; 6,428,172; 6,420,975; 6,326,613; 6,278,377; 6,243,003; 6,250,148; 6,172,613 and/or 6,087,953, and/or U.S. Publication Nos. US-2015-0327398; US-2014-0226012 and/or US-2009-0295181, which are all hereby incorporated herein by reference in their entireties. Optionally, the vision system may include a plurality of exterior facing imaging sensors or cameras, such as a rearward facing imaging sensor or camera, a forwardly facing camera at the front of the vehicle, and sideward/rearward facing cameras at respective sides of the vehicle, which capture image data representative of the scene exterior of the vehicle.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224;

7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A control system for a vehicle, said control system comprising:
   a camera module disposed in a vehicle, said camera module comprising a plurality of cameras;
   a control operable to adjust a field of view of any one of said cameras responsive to an input;
   wherein, responsive to image processing of image data captured by said cameras, said control generates an output to control at least one vehicle control system to maneuver the vehicle;
   wherein, when the vehicle is traveling in and along a traffic lane, said control sets the field of view of at least some of said cameras to be forward through a windshield of the vehicle;
   wherein, responsive to an input indicative of an intended lane change by the vehicle, said control adjusts an orientation of at least one camera of said cameras to set the field of view of said at least one camera to be toward an exterior rearview mirror at the side of the vehicle at which a target lane is located such that the field of view of said at least one camera encompasses a mirror reflective element of that exterior rearview mirror; and
   wherein, responsive to determination, via image processing of captured image data when said at least one camera views the mirror reflective element of the exterior rearview mirror of the vehicle, that the target lane is clear, said control generates an output to control the at least one vehicle control system to maneuver the vehicle into the target lane.

2. The control system of claim 1, wherein said camera module comprises said control.

3. The control system of claim 1, wherein said camera module generates the output to maneuver the vehicle into the target lane at least in part responsive to a blind spot detection system of the vehicle.

4. The control system of claim 1, wherein said camera module changes the field of view of individual ones of said cameras via at least one actuator of said camera module.

5. The control system of claim 1, wherein said camera module is configured to be disposed at an upper region of a driver's seat of the vehicle.

6. The control system of claim 1, wherein, responsive to an input indicative of an intended lane change by the vehicle, said control adjusts the orientation of another camera of said cameras to set the field of view of the other camera to be toward an interior rearview mirror of the vehicle.

7. The control system of claim 1, wherein, responsive to an input indicative of an intended lane change by the vehicle, said control adjusts the orientation of another camera of said cameras to set the field of view of the other camera to be toward a blind spot region at the side of the vehicle toward the target lane.

8. The control system of claim 1, wherein said cameras comprise an array of cameras that is adjustable to change the respective fields of view of said cameras.

9. The control system of claim 1, wherein at least some of said cameras have different focal lengths as compared to others of said cameras.

10. The control system of claim 1, wherein at least some of said cameras have different resolutions as compared to others of said cameras.

11. A control system for a vehicle, said control system comprising:
   a camera module disposed in a vehicle, said camera module comprising at least one camera;

a control operable to adjust a field of view of said at least one camera responsive to an input;

wherein, responsive to image processing of image data captured by said at least one camera, said control generates an output to control at least one vehicle control system to maneuver the vehicle;

wherein, when the vehicle is traveling in and along a traffic lane, said control sets the field of view of said at least one camera to be forward through a windshield of the vehicle;

wherein, responsive to an input indicative of an intended lane change by the vehicle, said control adjusts an orientation of said at least one camera to set the field of view of said at least one camera to be toward an exterior rearview mirror at the side of the vehicle at which a target lane is located such that the field of view of said at least one camera encompasses a mirror reflective element of that exterior rearview mirror; and wherein, responsive to determination, via image processing of captured image data when said at least one camera views the mirror reflective element of the exterior rearview mirror of the vehicle, that the target lane is clear, said control generates an output to control the at least one vehicle control system to maneuver the vehicle into the target lane.

12. The control system of claim 11, wherein said camera module comprises said control.

13. The control system of claim 11, wherein said camera module generates the output to maneuver the vehicle into the target lane at least in part responsive to a blind spot detection system of the vehicle.

14. The control system of claim 11, wherein said camera module changes the field of view of said at least one camera via at least one actuator of said camera module.

15. The control system of claim 11, wherein said camera module is configured to be disposed at an upper region of a driver's seat of the vehicle.

16. A control system for a vehicle, said control system comprising:

a camera module disposed in a vehicle, said camera module comprising a plurality of cameras;

a control operable comprising a processor that processes image data captured by said cameras;

wherein, responsive to image processing of image data captured by said cameras, said control generates an output to control at least one vehicle control system to maneuver the vehicle;

wherein a first camera of said plurality of cameras views forward through a windshield of the vehicle, and wherein, when the vehicle is traveling in and along a traffic lane, said processor processes at least image data captured by said first camera;

wherein a second camera of said plurality of cameras is oriented so that a field of view of said second camera is toward an exterior rearview mirror at a side of the vehicle at which a target lane is located such that the field of view of said second camera encompasses a mirror reflective element of that exterior rearview mirror, and wherein, responsive to an input indicative of an intended lane change by the vehicle, said processor processes at least image data captured by said second camera; and wherein, responsive to determination, via image processing of image data captured by said second camera, that the target lane is clear, said control generates an output to control the at least one vehicle control system to maneuver the vehicle into the target lane.

17. The control system of claim 16, wherein said camera module generates the output to maneuver the vehicle into the target lane at least in part responsive to a blind spot detection system of the vehicle.

18. The control system of claim 16, wherein said camera module is configured to be disposed at an upper region of a back of a driver's seat of the vehicle.

19. The control system of claim 16, wherein a third camera of said plurality of cameras has a field of view toward an interior rearview mirror of the vehicle, and wherein, responsive to the input indicative of the intended lane change by the vehicle, said processor processes image data captured by said third camera.

20. The control system of claim 16, wherein a third camera of said plurality of cameras has a field of view toward a blind spot region at the side of the vehicle toward the target lane, and wherein, responsive to the input indicative of the intended lane change by the vehicle, said processor processes image data captured by said third camera.

* * * * *